United States Patent
Grimm et al.

(10) Patent No.: US 10,507,842 B2
(45) Date of Patent: Dec. 17, 2019

(54) METHOD FOR MONITORING A DRIVE-BY-WIRE SYSTEM OF A MOTOR VEHICLE

(71) Applicant: Robert Bosch GmbH, Stuttgart (DE)

(72) Inventors: Andreas Grimm, Tiefenbronn-Muehlhausen (DE); Bernd Mueller, Leonberg (DE); Evgeniya Ballmann, Stuttgart (DE); Isidro Corral Patino, Stuttgart (DE); Markus Reichert, Ilsfeld-Schozach (DE); Simon Hufnagel, Herrieden (DE); Thomas Hartgen, Ludwigsburg (DE); Thomas Mauer, Schwieberdingen (DE)

(73) Assignee: Robert Bosch GmbH, Stuttgart (DE)

( * ) Notice: Subject to any disclaimer, the term of this patent is extended or adjusted under 35 U.S.C. 154(b) by 204 days.

(21) Appl. No.: 15/548,597

(22) PCT Filed: Jan. 5, 2016

(86) PCT No.: PCT/EP2016/050083
§ 371 (c)(1),
(2) Date: Aug. 3, 2017

(87) PCT Pub. No.: WO2016/124343
PCT Pub. Date: Aug. 11, 2016

(65) Prior Publication Data
US 2018/0009444 A1 Jan. 11, 2018

(30) Foreign Application Priority Data

Feb. 6, 2015 (DE) .......... 10 2015 202 132
Dec. 17, 2015 (DE) .......... 10 2015 225 617

(51) Int. Cl.
*B60W 50/04* (2006.01)

(52) U.S. Cl.
CPC ....... *B60W 50/045* (2013.01); *B60W 2400/00* (2013.01); *B60W 2540/10* (2013.01);
(Continued)

(58) Field of Classification Search
CPC .......... B60W 50/045; B60W 2400/00; B60W 2540/10; G05B 23/0229
See application file for complete search history.

(56) References Cited

U.S. PATENT DOCUMENTS

2005/0029869 A1\* 2/2005 Teran, Jr. .............. F02D 11/107
307/10.1
2009/0216393 A1 8/2009 Schimert

FOREIGN PATENT DOCUMENTS

DE 10162689 A1 7/2002
DE 102004062811 A1 6/2006
(Continued)

OTHER PUBLICATIONS

"Standardisiertes E-Gas Überwachungskonzept für Benzin und Diesel Motorsteuerungen ["Standardized e-gas monitoring design for gasoline and diesel engine control systems"]," work group EGAS, Jul. 5, 2013, version 5.5).

(Continued)

*Primary Examiner* — Michael D Lang
(74) *Attorney, Agent, or Firm* — Norton Rose Fulbright US LLP; Gerard Messina (57) ABSTRACT

A method for monitoring a drive-by-wire system of a motor vehicle, including: temporally offset reading in of at least two input values of an input quantity of an operating element of the motor vehicle; ascertaining a change over time or rate of change over time of the input quantity from the at least two read-in input values; determination of a monitored quantity for the motor vehicle operation from the change over time or rate of change over time; selection of a (Continued)

monitoring function on the basis of the monitored quantity; monitoring of the monitored quantity for the ascertained motor vehicle operation by the monitoring function.

11 Claims, 3 Drawing Sheets

(52) U.S. Cl.
CPC ..... *B60W 2540/12* (2013.01); *B60W 2540/16* (2013.01); *B60W 2540/18* (2013.01)

(56) References Cited

FOREIGN PATENT DOCUMENTS

| | | |
|---|---|---|
| DE | 102007027040 A1 | 1/2008 |
| DE | 102010038516 A1 | 2/2012 |

OTHER PUBLICATIONS

International Search Report dated Mar. 21, 2016, of the corresponding International Application PCT/EP2016/050083 filed Jan. 5, 2016.

\* cited by examiner

METHOD FOR MONITORING A DRIVE-BY-WIRE SYSTEM OF A MOTOR VEHICLE

FIELD

The present invention relates to a method for monitoring a drive-by-wire system of a motor vehicle, as well as a computing unit and a computer program for carrying out the method.

BACKGROUND INFORMATION

In recent developments in motor vehicle design, there is a tendency for all driver commands to be forwarded electrically only, using drive-by-wire. Drive-by-wire (DbW) designates a driving or controlling of a motor vehicle without mechanical transmission of force by operating elements, such as gas pedal, brake pedal, or steering wheel, of the motor vehicle to the corresponding actuating elements of the motor vehicle, such as the throttle valve, brakes, and/or steering of the motor vehicle. An example of a conventional DbW system is the so-called e-gas system. The controlling of the named functions takes place instead via electrical lines and servomotors or electromechanical actuators. For safety reasons, the actuating elements of the motor vehicle have to be permanently monitored in order to prevent malfunctioning, such as an undesired acceleration of the motor vehicle.

The monitoring can be realized according to a three-level design (cf. "Standardisiertes E-Gas Überwachungskonzept für Benzin and Diesel Motorsteuerungen ["Standardized e-gas monitoring design for gasoline and diesel engine control systems"]," work group EGAS, 5 Jul. 2013, version 5.5). A first level, the functional level, contains engine controlling functions, inter alia for realizing the requested engine torques, component monitoring, the diagnosis of the input and output quantities, and the controlling of the system reactions in case of recognized error. A second level, the function monitoring level, recognizes errored sequences in monitoring-relevant areas of the function software in level 1, inter alia by monitoring the calculated torques or the vehicle acceleration. In case of error, system reactions are triggered. A third level, the computer monitoring level, monitors whether the second level is operating correctly through a question-response communication. In case of error, the triggering of system reactions takes place independent of the function computer.

The three-level design can have a structure based on torque or based on acceleration.

A torque-based structure of the monitoring however does not have an intuitively understandable character, because the driver of the motor vehicle does not consciously control the torque. In addition, a complex physical model having many variables is required. In addition, there is a coupling between the functional level and the monitoring level via characteristic maps, input signals, and further interfaces. As a result, there is a high adaptation outlay for the monitoring level, because the characteristic maps, input signals, and interfaces have to be adapted.

In contrast, in an acceleration-based structure of the monitoring, the functional level and the monitoring level are decoupled from each other. In addition, in contrast to a torque-based structure an acceleration-based structure of the monitoring level contains different variables than does the functional level, because for example an activation of auxiliary components of the motor vehicle is not relevant for this type of monitoring. However, the acceleration-based structure also does not always have an intuitively understandable character. In addition, the monitoring level requires a complex physical model that is permanently calculated and therefore consumes computing resources of a microcontroller.

There is therefore a need for a method for monitoring a drive-by-wire system of a motor vehicle that is intuitively easy to understand and that preferably uses a small amount of computing resources. Moreover, this method should be easy to adapt to different variants, compared to the torque-based monitoring structure.

SUMMARY

According to the present invention, an example method is provided for monitoring a drive-by-wire system of a motor vehicle, and a computing unit and a computer program are also provided. Advantageous embodiments of the present invention are described herein.

The present invention includes not only carrying out the monitoring on the basis of input values, but also including a change over time or rate of change over time, e.g., a gradient or a value difference, of the input values or of quantities derived therefrom. The (e.g., physical) quantity represented by input values or the derived quantities is designated the input quantity. For example, a quantity derived from a pedal position is a drive torque. The change of the input quantity can here be the change of the gas pedal position, which is calculated as the difference of the gas pedal position at two successive points in time. The rate of change can be the gradient of the gas pedal position, which can be calculated as the change in the input quantity per time unit. In the present application, references to the processing (in particular change over time or rate of change over time) of the input quantity are always to be understood as also including the processing of quantities derived therefrom.

According to a first partial aspect, the change or rate of change over time of the input quantity is used to determine the current driving desire of the driver, and subsequently to select monitoring functions for execution that are relevant for the determined driver's desire. This is to be understood as including both a direct and also an indirect selection; that is, for the determined driving desire of the driver, relevant monitoring functions are determined and are (directly) selected for execution, and/or monitoring functions that are irrelevant for the determined driver's desire are determined and are excluded from the execution (and the remaining ones are thereby indirectly selected).

This saves computing capacity, because all monitoring functions do not constantly have to be carried out; rather, a targeted selection can take place. Monitoring functions that are intuitively easy to understand, e.g., those for speed, drive torque, acceleration, deceleration, can be prepared, of which one or more relevant ones can then be selected, or irrelevant ones can be deactivated. Through the provision of corresponding monitoring functions, the method is also easy to adapt to different variants, because it is modular, and requires few interfaces between the functional level and the monitoring level.

According to a second partial aspect, and a monitoring function that is carried out, in particular one that is selected according to the first aspect, the sign of the change or rate of change over time of the input quantity is taken into account in order to more quickly recognize an error.

In the method for monitoring a drive-by-wire system of a motor vehicle, in a first step at least two input values of an operating element of the motor vehicle are read in in temporally offset fashion. The input values are values of operating elements of the motor vehicle with which the driver of the motor vehicle specifies in particular direction, speed, acceleration, and deceleration. Such an input value can in particular be specified by a gas pedal position, a brake pedal position, or a steering wheel angle.

In a further step, the input values and/or quantities derived therefrom are developed over time. In a simple realization, this can be the formation of a difference between the input values. Preferably, the gradient can be calculated from the difference, by taking into account the time difference between the two points in time, and can be taken into account as a change or rate of change over time.

In a further step, at least one monitored quantity is determined for the motor vehicle operation from the change or rate of change over time. The monitored quantity can be a driving speed, an acceleration or deceleration, a direction of travel, a brake path, a rotational speed of the wheels and/or of the engine, a steering angle of the wheels, a motor vehicle trajectory, an engine noise, an impulse, and/or a distance from another traffic participant. The monitored quantity essentially corresponds to the quantity that the driver actually wants to influence by his operation at that moment.

In a further step, a monitoring function that is relevant for the determined monitored quantity is selected and carried out; that is, the monitored quantity is monitored using the monitoring function. The monitoring function can for example include a target/actual comparison of input values and/or of changes or rates of change over time of the input values and/or of other quantities derived from the input values, or their changes or rates of change over time. Monitoring functions as such are known to those skilled in the art, and are therefore not described here in more detail. The monitoring function monitors the monitored quantity for freedom from error, and outputs an error signal in case of error.

Preferably, a monitoring function according to the present invention is used that is in accordance with the second partial aspect, in which it is decided within the monitoring function whether an error is present, already as a function of the sign of the change or rate of change over time of the input quantity, for example the change over time of the input values (or of the quantities derived therefrom).

The ascertaining of the change or rate of change over time of the input quantity uses only a small amount of computing resources, but enables a simple selection of the monitored quantity relevant for the driver's wish. In addition, the change of the input quantity over time permits acquisition of an error in a particularly intuitive manner, e.g., if a driver of the motor vehicle relieves force on the gas pedal of the motor vehicle, i.e., lets up on the gas, but at the same time the engine torque of the drive of the motor vehicle increases.

Normally, the gradient of the engine torque falls when the gradient of the gas pedal position is also falling. If, however, due to an error of the drive-by-wire system the gradient of the engine torque is increasing or is constant, this can easily be acquired by comparing the two gradients, and the error signal can thereupon be produced. A precise torque value does not even have to be calculated.

According to a preferred specific embodiment, the monitoring of the monitored quantity includes a determination and evaluation of a sign of the change or rate of change over time of the input quantity. Here, the sign of the change or rate of change over time is positive when the input quantity becomes greater, and the sign of the change or rate of change over time is negative when the input quantity becomes smaller. The change or rate of change over time can also be zero if the input quantity remains constant. This simplifies the evaluation because no numerical values, but rather only a logical value, have to be processed. The result of a logical linkage can be used to select regions of the motor vehicle that are to be monitored, such as relevant quantities such as monitored quantities, or to activate or deactivate parts of the monitoring system, again saving computing resources. If for example a gradient of the gas pedal position, as input quantity, is positive, i.e., the gas pedal is being pressed, a monitoring of the acceleration is not of interest because the driver then wants to accelerate anyway. In contrast, a monitoring for an undesired deceleration is relevant here.

According to a further specific embodiment, in addition or alternatively the monitoring of the monitored quantity also includes the determination and evaluation of the sign of the change or rate of change over time of the input quantity and the monitoring of the monitored quantity on the basis of the sign. This simplifies the monitoring of the regulated quantity again, because only binary values have to be linked, with simple logic circuits. Preferably, from the sign of the change or rate of change over time of the input quantity, an expected sign of a development over time of the monitored quantity is determined and is compared to an actual sign. When a driver relieves the force on the gas pedal of the vehicle, i.e., lets up on the gas, the expected development over time of the monitored quantity 'speed' that results therefrom is negative. If, in contrast, the actual development over time of the monitored quantity 'speed' is now positive, an error is recognized.

According to a specific embodiment, the drive-by-wire system goes into a safe state when the monitoring function recognizes an error. In the safe state, the drive-by-wire system is secured in such a way that the acquired malfunction can no longer lead to dangerous driving situations. In this way, continued operation of the motor vehicle is possible despite the malfunction.

According to a further specific embodiment, the determination of the at least one monitored quantity for the vehicle operation first includes a determination of the desired driving state and/or operating state. The determination of the desired driving state and/or operating state can for example include an assignment of the actions of the driver to the state, using a finite-state machine or using fuzzy logic. Because both the number of states and the number of operating elements is known, a suitable finite-state machine can be provided in each case.

The driving state is understood as the state characterizing the continued movement of the vehicle, i.e., generally acceleration, deceleration, driving at constant speed, standing still. The operating state is understood as the state characterizing the manner of operation of the vehicle, i.e., generally electric driving, internal combustion engine driving, hybrid driving, recuperation, boosting, charging the battery or batteries, changing gears.

If a driving state and/or operating state is first generally determined from the actions of the driver of the motor vehicle, this facilitates the subsequent determination of the possible monitored quantities for the ascertained driving state and/or operating state, because, normally, for each driving state and/or operating state there exists only a certain appropriate selection of intuitive monitored quantities, e.g., when driving with constant speed, generally only the speed itself.

According to a further specific embodiment, in the monitoring of the monitored quantity in addition at least one driving parameter and/or environmental parameter is taken into account. In this way, the precision of the monitoring is increased, because, in addition to the input value directly influenced by the driver, additional driving parameters and/or environmental parameters also normally determine the target value of the monitored quantity. For example, in addition to the pedal positions, driving speed and acceleration or deceleration are also a function of the switching state of the transmission, of a load, of an inclination of the street (downhill slope), of a wind situation (headwind or tailwind), etc. These parameters are measurable and can therefore be taken into account.

According to a further specific embodiment, for the monitoring of the monitored quantity a model is used for the motor vehicle operation. For example, for various driving situations, such as acceleration or deceleration, various simple models can be provided. In this sense, no coupling takes place between the functional level (level 1) and the monitoring level (level 2) using characteristic maps that are expensive to populate with data. Because the models of the monitoring level contain different variables than in the functional level, they are largely decoupled from the functional level. These models can easily be adapted, are easy to parameterize, and can easily be replaced, because of the modular design.

For example, the models have a polynomial function, a spline function, an exponential saturation curve, an exponential decay function, and/or a random walk function that links the at least one input value with the target value. In this way, the models make use of standard functions, so that the models have a particularly simple design and use a particularly small amount of computing resources.

A computing unit according to the present invention, e.g., a control device of a motor vehicle, is set up, in particular in terms of programming, to carry out a method according to the present invention.

The implementation of the method in the form of software is also advantageous, because this results in particularly low costs, in particular if an executing control device is also used for further tasks and is therefore already present anyway. Suitable data carriers for providing the computer program are in particular diskettes, hard drives, flash memories, EEPROMs, CD-ROMs, DVDs, the cloud, etc. Downloading a program via computer networks (Internet, intranet, etc.) is also possible.

Further advantages and embodiments of the present invention are described below and are shown in the figures.

It will be understood that the features described above and explained below may be used not only in the respectively indicated combination, but also in other combinations or by themselves, without departing from the scope of the present invention.

The present invention is shown schematically in the figures on the basis of an exemplary embodiment, and is described in detail below with reference to the figures.

DETAILED DESCRIPTION OF EXAMPLE EMBODIMENTS

Figure 1:
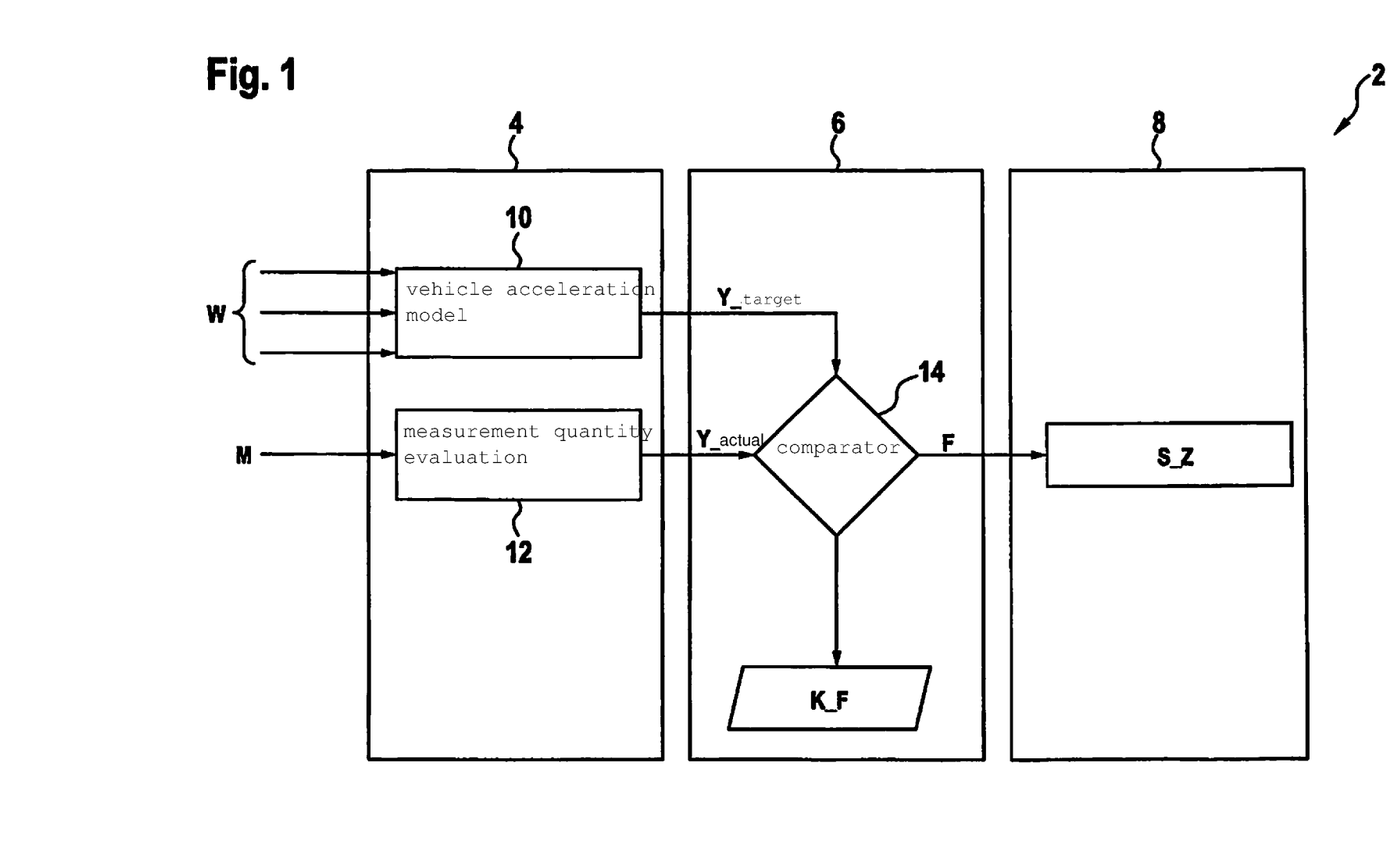
FIG. 1 shows, in a schematic representation, a design of a monitoring system for a drive-by-wire system of a motor vehicle.

FIG. 1 schematically shows the design of an exemplary monitoring system 2 of a drive-by-wire system of a motor vehicle, having for example an internal combustion engine, an electric motor, or a hybrid drive as drive. With the drive-by-wire system, driver commands of the motor vehicle driver are electrically forwarded, via drive-by-wire, from operating elements, such as gas pedal, brake pedal, gearshift lever, or steering wheel, to the corresponding actuating elements of the motor vehicle, such as throttle valve, power converter, transmission, brakes, and/or steering.

Malfunctions of the drive-by-wire system can result in signals that address the actuating elements in an undesired manner and thus cause dangerous driving situations, e.g., undesired acceleration of the motor vehicle. Using monitoring system 2, the drive-by-wire system is monitored for such malfunctions. When such a malfunction has been determined, an error signal F is produced that causes the drive-by-wire system to go into a safe state S_Z in which the drive-by-wire system is secured in such a way that the acquired malfunction can no longer cause dangerous driving situations. In the simplest case, this leads to a secured switching off.

For this purpose, monitoring system 2 has a modeling module 4, an error detection module 6, and an error reaction module 8. Monitoring system 2, modeling module 4, error detection module 6, and/or error reaction module 8 can have hardware and/or software components for this purpose.

Modeling module 4 has a multiplicity of models for various driving situations, of which, for reasons of clarity, only a vehicle acceleration model 10 is shown, which describes the acceleration behavior of the motor vehicle, as is described in more detail below.

Additional models can relate to the deceleration behavior, behavior during travel at constant speed, rotational speed behavior of the wheels and of the drive, steering behavior, following behavior of the motor vehicle when following a specified trajectory, noise development behavior, and/or behavior when maintaining a specified distance.

Input values W are supplied to the model, which values are acquired using measurement technology at the operating elements of the motor vehicle. In the present case, for vehicle acceleration model 10, these are at least a gas pedal position of the motor vehicle and a gradient of the gas pedal position.

As output quantity, vehicle acceleration model 10 supplies for example a target value Y_target for the acceleration of the motor vehicle, or/and a gradient of the acceleration.

A measurement quantity of evaluation 12 is assigned to vehicle acceleration model 10. Measurement quantity evaluation 12 acquires measurement values, or actual values Y_actual, of the motor vehicle, such as acceleration, speed, and/or direction of travel of the motor vehicle, and also acquires or calculates values derived from the measurement values, such as gradients. In the present case, measurement quantity evaluation 12 acquires an actual vehicle acceleration in the direction of travel, e.g. using an acceleration sensor.

Target value Y_target and actual value Y_actual are provided to error detection module 6. In the example shown, error detection module 6 operates according to a target/ actual comparison, and has a comparator 14 that compares the associated value pairs of target value Y_target and actual value Y_actual to one another. In the present case, these are the target vehicle acceleration and the actual vehicle acceleration or/and the target vehicle acceleration gradient and the actual vehicle acceleration gradient.

If the difference between the target value Y_target and actual value Y_actual and/or the gradient is smaller than a threshold value, a malfunction K_F is not present. If the difference is greater than the threshold value, an error is inferred, based on an error of the drive-by-wire system, and error signal F is produced.

Error signal F is supplied to error reaction module 8, which puts the drive-by-wire system into safe state S_Z, in which the acquired malfunction can no longer lead to dangerous driving situations.

Figure 2:
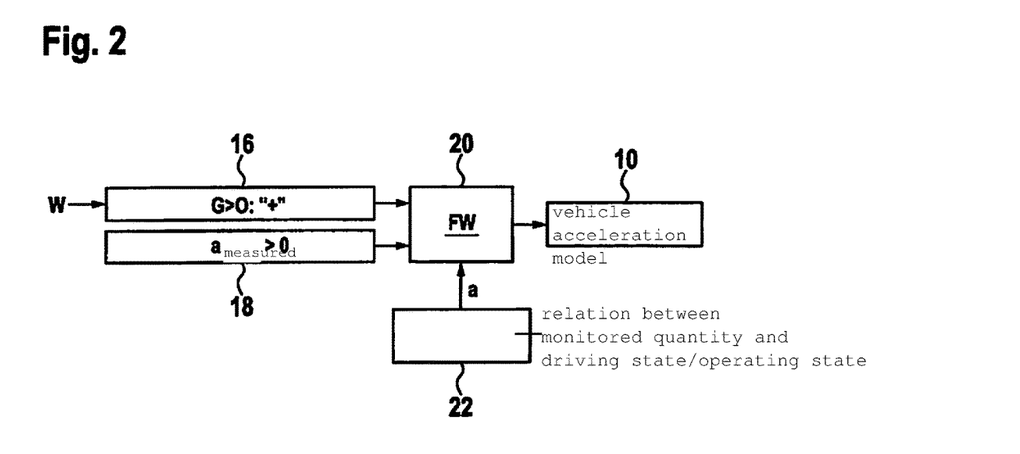
FIG. 2 shows, in a schematic representation, the selection of a model from a plurality of models.

FIG. 2 shows the process of selecting a model from the multiplicity of models of model module 4 using a finite-state machine 20 of model module 4. For this purpose, finite-state machine 20 first determines a desire driving state and/or operating state as driver's wish FW. This facilitates the subsequent ascertaining of the monitored quantities that are possible for the ascertained driving state and/or operating state, because standardly for each driving state and/or operating state there exists only a certain appropriate selection of monitored quantities; e.g. during accelerated driving, generally only the acceleration or deceleration itself.

An input evaluation unit 16 evaluates inputs from the driver of the motor vehicle to the operating elements of the motor vehicle in the form of the at least one input value W, in order to determine the at least one gradient G and the sign of the gradient.

For example, the gradient G of the gas pedal position is determined, in which a first measurement value of the gas pedal position and a second measurement value of the gas pedal position are acquired at two different measurement times that are temporally at a distance from one another. Through numerical differentiation, the gradient is obtained.

In the present exemplary embodiment, a plurality of gas pedal positions are acquired temporally one after the other, and through evaluation the gradient G of the gas pedal positions and the sign of the gradient are determined. In this way, the evaluation yields for example the result that the driver of the motor vehicle is pressing down on the gas pedal. This movement of the gas pedal results in gradient G being greater than zero. The sign is therefore positive, or "+."

In addition, a driving situation acquisition unit 18 acquires the driving situation of the motor vehicle, e.g., through evaluation of measurement values that are measured by sensors of the motor vehicle. In the present exemplary embodiment, an acceleration $a_{meas}$ greater than zero of the motor vehicle in the direction of travel is acquired, for example using an acceleration sensor of the motor vehicle.

Gradient G determined by input evaluation unit 16, and its sign, as well as the acceleration $a_{meas}$, are supplied to finite-state machine 20, which links the sign "+" of gradient G and the measured acceleration $a_{meas}$, e.g. using fuzzy logic, in order to select a monitored quantity from a plurality of monitored quantities. Here, the use of fuzzy logic makes it possible to describe relations of quantities for which there is no precise physical model. Correspondingly, finite-state machine 20 determines "acceleration" as the desired driving state. Finite-state machine 20 learns the associated monitored quantity "acceleration" a from a relation 22 between a monitored quantity or quantities and a driving state and/or operating state.

For the selection of the monitored quantity, in the present exemplary embodiment acceleration a in the direction of travel, finite-state machine 20 selects vehicle acceleration model 10 from a plurality of models.

Figure 3:
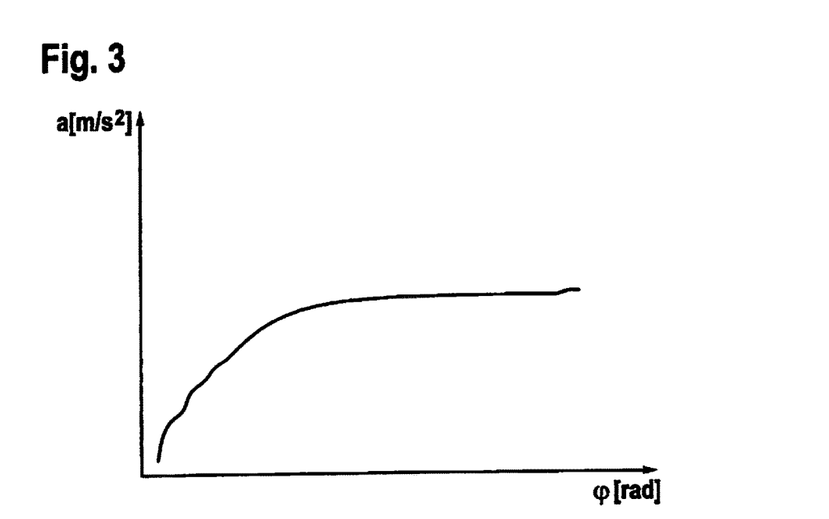
FIG. 3 shows, in a schematic representation, an exponential saturation function of a vehicle acceleration model.

FIG. 3 shows an exponential saturation function of vehicle acceleration model 10, which describes a relation between input quantity, here for example gas pedal position φ, on the x axis, and target value Y_target, in this case target acceleration a of the motor vehicle in the direction of travel, on the y axis.

Here it is assumed that as a result of an actuation of the gas pedal and absence of actuation of the brake pedal, there is an increased acceleration of the motor vehicle in the direction of travel, but a maximum acceleration cannot be exceeded, due to the limited capacity of the drive mechanism of the motor vehicle and due to driving resistances.

The exponential saturation function can have the general form $$Y\_target = m(1-e^{dx})$$

where the parameters slope d and saturation limit m can be adapted to the driving behavior of the motor vehicle.

In this case, actual value Y_ist is the actual acceleration of the motor vehicle in the direction of travel. It can be determined for example from the rotational speed of the wheels of the motor vehicle and an item of incline information relating to the route profile, or from an acceleration measured by an acceleration sensor. The incline information contains data concerning rises and falls of the route on which the motor vehicle is moving. These data can be determined for example using GPS, an electronic map, or an incline sensor of the motor vehicle.

Thus, for error-free operation of the drive-by-wire system a condition is that the expected gradient of the acceleration of the motor vehicle in the direction of travel (as change or rate of change of the monitored quantity) is greater than zero, in particular when the inclination and driving resistances have been overcome. If, however, the actual gradient is less than zero, there is an error in relation to the safety goal "undesired deceleration." Therefore, here monitoring of the sign is sufficient; calculation of the acceleration model is not required, which reduces the required computing resources.

Figure 4:
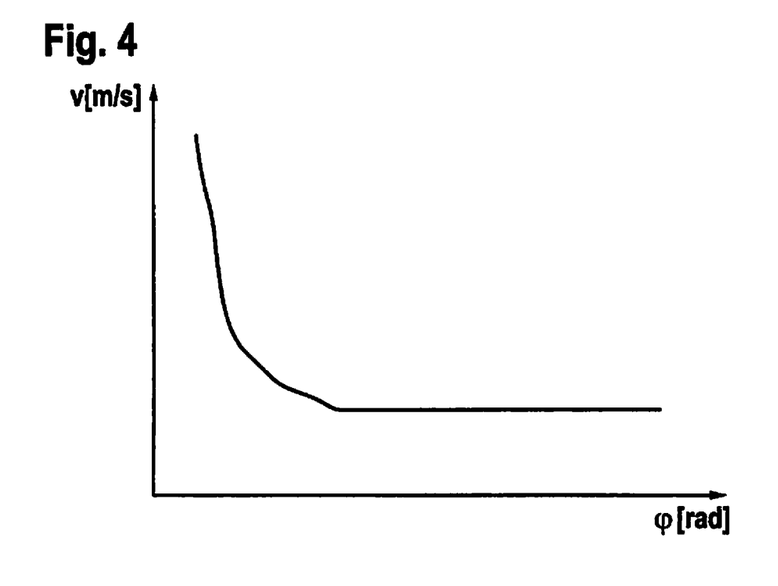
FIG. 4 shows, in a schematic representation, an exponential decay function of a vehicle deceleration model.

FIG. 4 shows an exponential decay function of a vehicle deceleration module that describes the relation between input quantity, here for example brake pedal position φ, on the x axis and target value Y_target, in this case target speed v of the motor vehicle in the direction of travel, on the y axis. The model describes the behavior of the motor vehicle during braking through actuation of the brake pedal.

Here it is assumed that as a result of an actuation of the brake pedal there is a decreasing speed of the motor vehicle in the direction of travel, until finally the motor vehicle is standing still, and/or the motor vehicle comes to a standstill at a particular distance from an obstacle. The actuation of the brake pedal leads to an expected gradient of the brake pedal position greater than zero.

The target speed of the motor vehicle in the direction of travel can be determined for example from the rotational speed of the wheels of the motor vehicle, while the distance from an obstacle can be determined for example using a distance radar.

Thus, for an error-free operation of the drive-by-wire system it is a condition here that the expected gradient of the acceleration of the motor vehicle in the direction of travel (as change or rate of change over time of the monitored quantity) is less than zero, i.e., is negative, when the incline information is calculated. If, however, the actual gradient of the acceleration is greater than zero, then an error is present in relation to the safety goal "undesired acceleration." Thus, here it is sufficient to monitor the sign, and a calculation of the acceleration model is not necessary, which reduces the required computing resources.

Figure 5:
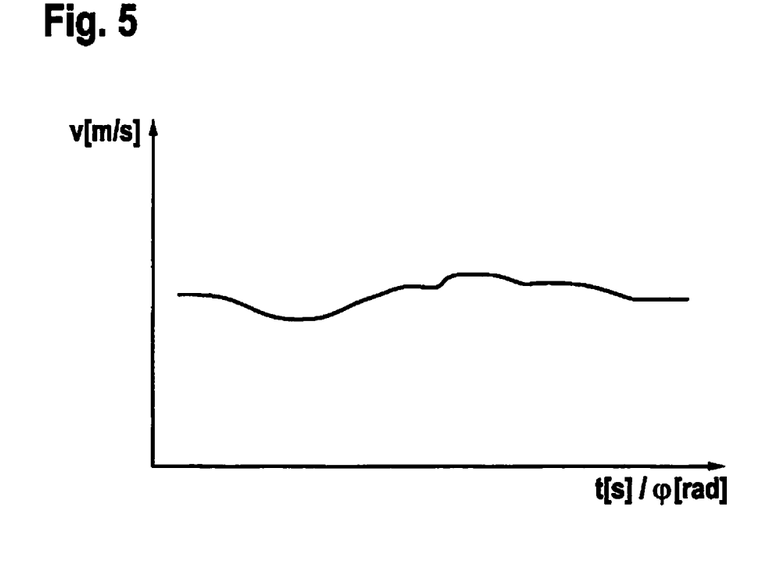
FIG. 5 shows, in a schematic representation, a random walk function of a vehicle driving model that describes the behavior of the motor vehicle at constant speed.

FIG. 5 shows a random walk function of a vehicle driving model for the target value Y_target, in this case target speed v of the motor vehicle in the direction of travel. The vehicle driving model describes the behavior of the motor vehicle at constant speed. It has as few deviations as possible of the speed of the motor vehicle as a function of tolerances of the gas pedal positions, namely of the gas pedal and of the brake pedal. Here it is assumed that as a result of a constant gas pedal position and absence of actuation of the brake pedal during travel on a plane, a constant speed of the motor vehicle in the direction of travel arises, or, when there is actuation of the brake pedal, i.e., a positive gradient of the brake pedal position, travel is taking place along a downhill stretch.

The target speed of the motor vehicle in the direction of travel can be determined for example from the rotational speed of the wheels of the motor vehicle.

In such a driving situation, a simple data model can be used, having as few deviations as possible of the speed of the vehicle as a function of the tolerances of the gas pedal position, which reduces the required computing resources.

What is claimed is:

1. A method for monitoring a drive-by-wire system of a motor vehicle, comprising:
    temporally offset reading in at least two input values of an input quantity of an operating element of the motor vehicle;
    ascertaining one of (i) a change over time, or (ii) rate of change over time, of the input quantity from the at least two read-in input values;
    determining a monitored quantity for the motor vehicle operation from the change over time or rate of change over time;
    selecting a monitoring function based on the monitored quantity; and
    monitoring the monitored quantity for the ascertained motor vehicle operation, using the selected monitoring function;
    wherein the monitoring of the monitored quantity for the ascertained motor vehicle operation by the selected monitoring function includes outputting of an error signal in case of error.

2. The method as recited in claim 1, wherein the selection of the monitoring function based on monitored quantity includes a determination of a sign of the change over time or rate of change over time of the input quantity and the selection of the monitoring function on the basis of the sign.

3. The method as recited in claim 1, wherein the monitoring of the monitored quantity for the ascertained motor vehicle operation by the monitoring function includes a determination of a sign of the change over time or rate of change over time of the input quantity and the monitoring of the monitored quantity based on the sign.

4. The method as recited in claim 3, wherein an expected sign of a change over time of the monitored quantity is determined from the sign of the change over time or rate of change over time of the input quantity, and the expected sign is compared to an actual sign of a change over time or rate of change over time of the monitored quantity.

5. The method as recited in claim 1, wherein the drive-by-wire system is put into a safe state in response to the error signal.

6. The method as recited in claim 1, wherein the selection of a monitoring function based on the monitored quantity includes at least one of: (i) a selection of a relevant monitoring function for execution, and (ii) an exclusion of an irrelevant monitoring function from execution.

7. The method as recited in claim 1, wherein the monitoring of the monitored quantity includes taking into account at least one of: (i) a driving parameter, and (ii) an environmental parameter.

8. The method as recited in claim 1, wherein the input quantity includes at least one of: (i) a gas pedal position, (ii) a brake pedal position, (iii) a gearshift lever position, and (iv) a steering wheel angle.

9. A method for monitoring a drive-by-wire system of a motor vehicle, comprising:
    temporally offset reading in at least two input values of an input quantity of an operating element of the motor vehicle;
    ascertaining one of (i) a change over time, or (ii) rate of change over time, of the input quantity from the at least two read-in input values;
    determining a monitored quantity for the motor vehicle operation from the change over time or rate of change over time;
    selecting a monitoring function based on the monitored quantity; and
    monitoring the monitored quantity for the ascertained motor vehicle operation, using the selected monitoring function;
    wherein the determination of the at least one monitored quantity for the vehicle operation includes at first a determination of at least one of a desired driving state and desired operating state.

10. A method for monitoring a drive-by-wire system of a motor vehicle, comprising:
    temporally offset reading in at least two input values of an input quantity of an operating element of the motor vehicle;
    ascertaining one of (i) a change over time, or (ii) rate of change over time, of the input quantity from the at least two read-in input values;
    determining a monitored quantity for the motor vehicle operation from the change over time or rate of change over time;
    selecting a monitoring function based on the monitored quantity; and
    monitoring the monitored quantity for the ascertained motor vehicle operation, using the selected monitoring function;
    wherein the at least one monitored quantity for the motor vehicle operation includes at least one of: (i) a driving speed, (ii) an acceleration or deceleration, (iii) a direction of travel, (iv) a brake path, (v) a rotational speed of wheels, (vi) a speed of an engine, (vii) a steering angle of wheels, (viii) a motor vehicle trajectory, (ix) an engine noise, (x) an impulse, and (xi) a distance from another traffic participant.

11. A computing unit designed for monitoring a drive-by-wire system of a motor vehicle, the computing unit designed to:
    temporally offset read in at least two input values of an input quantity of an operating element of the motor vehicle;
    ascertain one of (i) a change over time, or (ii) rate of change over time, of the input quantity from the at least two read-in input values;

determine a monitored quantity for the motor vehicle operation from the change over time or rate of change over time;
select a monitoring function based on the monitored quantity; and
monitor the monitored quantity for the ascertained motor vehicle operation, using the selected monitoring function;
wherein the at least one monitored quantity for the motor vehicle operation includes at least one of: (i) a driving speed, (ii) an acceleration or deceleration, (iii) a direction of travel, (iv) a brake path, (v) a rotational speed of wheels, (vi) a speed of an engine, (vii) a steering angle of wheels, (viii) a motor vehicle trajectory, (ix) an engine noise, (x) an impulse, and (xi) a distance from another traffic participant.

* * * * *